United States Patent
Hochuli

[11] 3,899,750
[45] Aug. 12, 1975

[54] LONG LIFE GAS LASER SYSTEM AND METHOD

[76] Inventor: Urs E. Hochuli, 7011 Southwark Ter., Hyattsville, Md. 20782

[22] Filed: Sept. 21, 1973

[21] Appl. No.: 399,295

[52] U.S. Cl. .......................................... 331/94.5 G
[51] Int. Cl.² .......................................... H01S 3/02
[58] Field of Search ................... 331/94.5; 330/4.3; 313/223, 237

[56] References Cited
UNITED STATES PATENTS
3,742,378   6/1973   Timmermans ................... 331/94.5

Primary Examiner—William L. Sikes

[57] ABSTRACT

There is disclosed a long life gas discharge laser having an improved self repairing cathode system and method. In a specific embodiment, water vapor having a partial pressure below about $10^{-5}$ Torr incorporated in a molecular sieve is used to provide impurities (in this case water vapor) for repairing the cathode surface by regenerating the oxide surface and/or preventing same from deteriorating. Other impurities may be incorporated in the molecular sieve such as hydrogen, oxygen, for example. In some cases $CO_2$ may be used.

This application includes material disclosed in a paper entitled "Continuation of the Investigation into Material Properties Affecting the Frequency Stability and Reliability of He-Ne Laser Structures" submitted to the Office of Naval Research dated June 1972 by the inventor hereof and also a paper entitled "Investigations of the Long Term Frequency Stability of Stable Laser Structures" Progress Report for ONR Contract N00014-67-A-D239-0016 July 1972 by the inventor hereof. A royalty free license is hereby granted to the United States for use of the invention for all government purposes.

3 Claims, 2 Drawing Figures

HE-NE LASER
RELATIVE POWER OUTPUT VS. PARTIAL IMPURITY PRESSURE

LONG LIFE GAS LASER SYSTEM AND METHOD

BACKGROUND AND BRIEF DESCRIPTION OF THE INVENTION

This invention relates to a long life gas laser having an improved self repairing cathode system and method.

There are available a number of gas discharge laser structures using low current density cathode structures as shown in my U.S. Pat. Nos. 3,614,642 dated Oct. 19, 1971 and 3,719,900 dated Mar. 6, 1973, application No. 189,527 dated Oct. 15, 1971. The first mentioned patent discloses an oxidized aluminum alloy cathode structure. Such lasers have a useful life of about 10 to 20 thousand hours or about one to two years. In a number of commercial applications it is highly desireable that the useful life of such lasers be at least several times this magnitude and more. I have found that a basic cause of laser failure is destruction of the oxide layer on the cathode surface. The object of this present invention is to provide a long life cathode system for such lasers. Upon initiation or beginning of damage to the oxide layer on the cathode surface a gaseous impurity provided in the laser effects repair of the oxide surface. While it is believed that the oxide layer is repaired, it is also possible that the gaseous impurities act to retard destruction of the cathode. A further objection is to prevent premature cathode failure, due to imperfectly or incompletely formed oxide layer, by oxidation processes at the cathode surface.

In accordance with the invention a source of one or more gaseous impurities at a pressure below about $10^{-5}$ Torr is included in the laser. An example of a useful gas mixture for the helium-neon laser consists of 9 parts helium to 1 part neon with a total pressure of about 3 Torr. In a specific embodiment of a helium-neon laser, the gaseous impurity is water vapor incorporated in a molecular sieve. Other impurities such as hydrogen and oxygen may be used and mixtures thereof may be used provided the partial pressure thereof does not exceed about $10^{-5}$ Torr. The molecular sieve may be incorporated in the cathode chamber itself or be added as an appendage to the glass tubing from the cathode chamber to the capillary bore of the laser. Since helium and neon have the highest ionization potentials of all the elements, any impurity will automatically be carried to the cathode chamber by the cataphoresis effect.

BRIEF DESCRIPTION OF DRAWINGS

The above and other objects, advantages and features of the invention will become more apparent from the following description considered with the drawings wherein.

DESCRIPTION OF THE INVENTION

Figure 1:
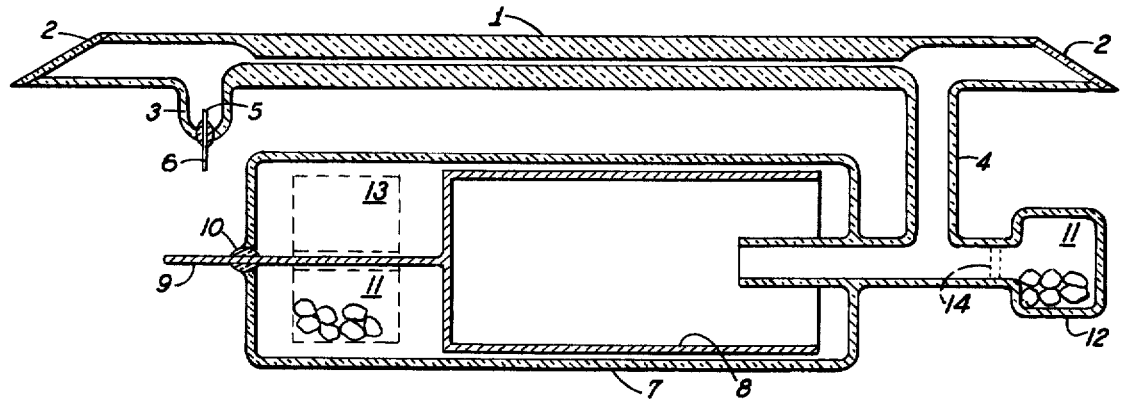
FIG. 1 is a crossectional view of a gas-discharge laser incorporating the invention and FIG. 2 is a set of curves illustrating the influence of hydrogen, oxygen and water vapor on the power output of a helium-neon laser.

Referring to FIG. 1 a conventional laser tube consisting of a standard bore 1, made from Pyrex, fused quartz etc., and Brewster window ends 2. These windows may be sealed to the tube body 1 in the manner taught in my application Ser. No. 60,401 filed on Aug. 3, 1970. The electrodes are connected through side arm 3 and 4. Side arm 3 contains the anode 5, made from tungsten, nickel, platinum, Kovar etc., leading through the side arm 3 using a graded seal 6.

The cathode envelope and chamber contains the oxidized metal cathode 8 and is connected to side arm 4. The cathode connection 9 enters the envelope 7 through graded seal 10.

The impurity source 11 can be contained either in appendix 12 or in a separate package 13 behind the cathode end or, as shown, in both locations. The membrane 14 is porous in order to confine dust to appendix 12 and permeable enough to let gaseous impurities reach the cathode space. The package 13 can be designed in a similar way. Other means, including chemical reactions for providing the gaseous impurity when needed are contemplated by the disclosure.

The laser tube design shown in no way limits the invention from being incorporated in laser tubes of coaxial or other designs with or without internal mirrors.

Figure 2:
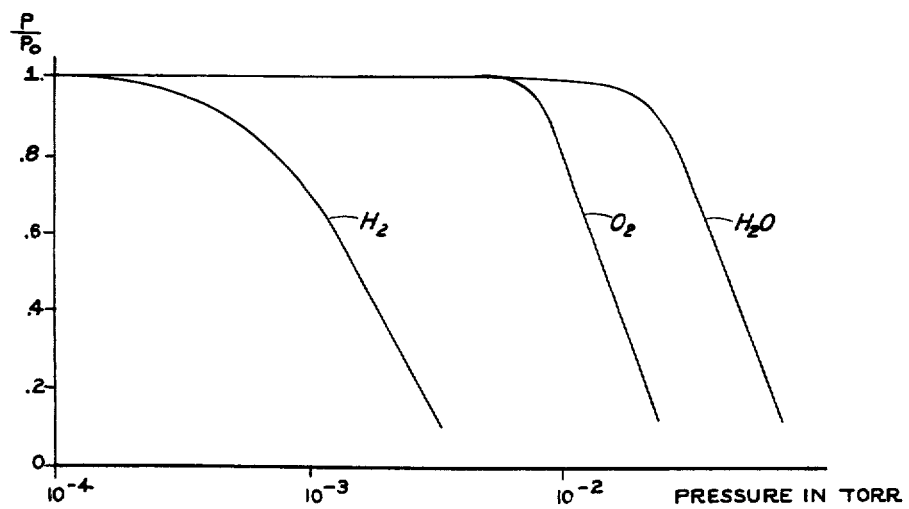

FIG. 2 indicates the tolerance of the helium-neon laser for hydrogen oxygen and water vapor impurities. The curve show that the power output of the laser is essentially unaffected by hydrogen partial pressures below $10^{-4}$ Torr, oxygen partial pressures below $5.10^{-3}$ Torr and water vapor partial pressures below $10^{-2}$ Torr.

What is claimed is:

1. In a gas laser having means forming an elongated gas filled bore, an anode and a low current density oxidized metal cathode at the respective ends of said bore, the improvement for extending the life of said laser comprising a source of gaseous impurities communicating with said cathode, said gaseous impurities having a partial pressure below about $10^{-5}$ Torr, wherein said impurity being selected from the group comprising hydrogen, oxygen, water vapor and mixtures thereof.

2. The invention defined in claim 1 wherein said source of gaseous impurities is a molecular sieve.

3. In a method of extending the life of a gaseous discharge laser having an elongated capillary bore connecting an anode and a low current density cathode, said cathode being constituted by an oxide coating on a metal base electrode element, the improvement comprising providing a source of impurity gas medium at a partial pressure below $10^{-5}$ Torr, said impurity gas medium being selected from hydrogen, oxygen and water vapor and mixtures thereof.

* * * * *